Feb. 4, 1964 W. G. SMITH ETAL 3,120,467
APPARATUS FOR DEPOSITING LIQUID DISPERSIONS
Original Filed Dec. 19, 1958
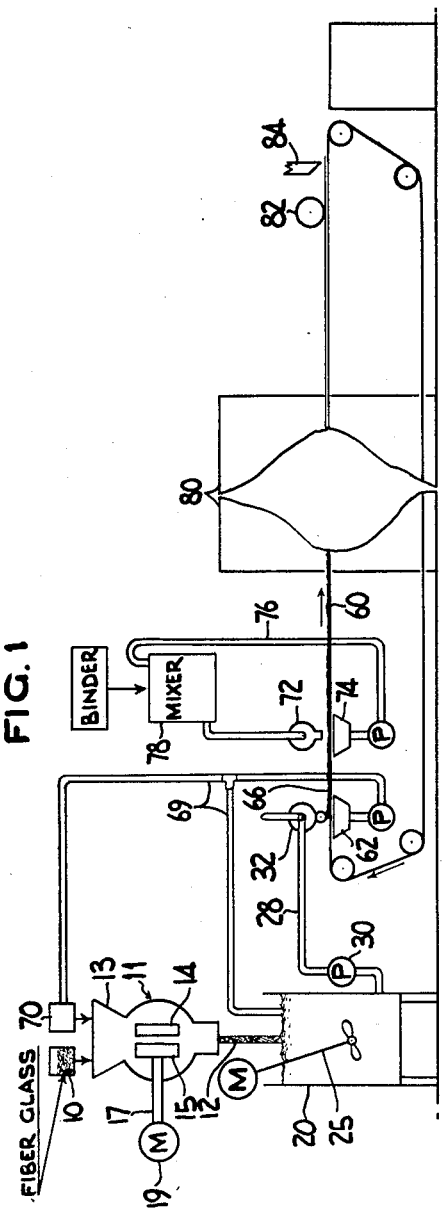
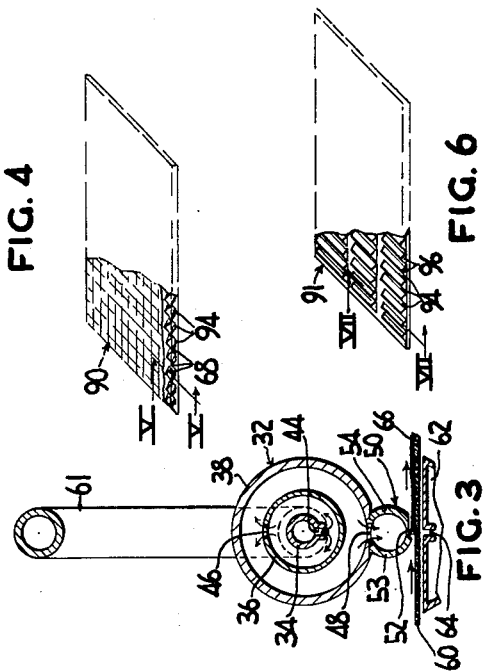
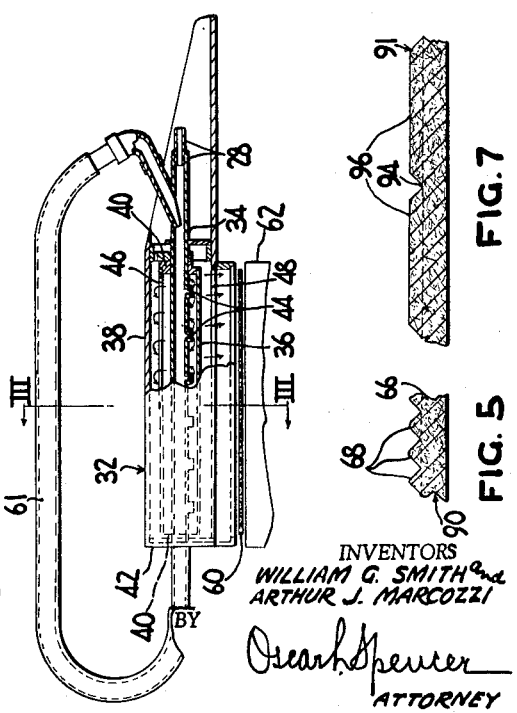
INVENTORS
WILLIAM G. SMITH and
ARTHUR J. MARCOZZI
BY
Oscar L. Spencer
ATTORNEY 3,120,467
APPARATUS FOR DEPOSITING LIQUID DISPERSIONS
William G. Smith, Sarver, and Arthur J. Marcozzi, Blairsville, Pa., assignors to Pittsburgh Plate Glass Company, a corporation of Pennsylvania
Original application Dec. 19, 1958, Ser. No. 781,718. Divided and this application Apr. 26, 1960, Ser. No. 24,722
2 Claims. (Cl. 162—337)

This invention relates to an apparatus for forming battery separators, and it has particular relation to apparatus for depositing liquid dispersions of glass fibers on a conveyor to make the battery separators.

It is known that glass wool mats can be used as retainer mats in a lead-acid storage battery. Glass wool in its commercial forms is too porous when formed in a thin mat to permit its use by itself as a battery separator. It does not prevent lead sulfate crystal growth between the electrodes in the battery, which is commonly known as "treeing." The glass wool mats must be used in combination with other materials such as microporous rubber, wood or phenolic resin-impregnated paper, which other materials act as the separator to prevent "treeing" in the battery.

It is an object of this invention to provide an apparatus for making a glass fiber battery separator composed of glass fibers and a binder therefor in such form that the fibers provide a microporous separator which permits passage of the electrolyte in the battery through it and vertical flow of gases formed during the battery reactions, but does not permit "treeing." The glass fiber separator should have a low electrical resistance and permit proper operation of the battery under all normal uses of a battery. The battery separator should be sturdy, yet flexible, so as to permit handling and assemblage of the separator in the battery. A glass fiber separator having these properties has the advantage that it is more resistant to deterioration by battery acids than cellulose-containing separators and therefore provides longer life for the battery and is less expensive than microporous rubber separators.

In accordance with the present invention, an apparatus is provided to make glass fiber battery separators by milling glass fibers to reduce their length so that about 90 percent or more by weight of the fibers have an average length of 0.008 to 0.125 inch and depositing an aqueous dispersion of the milled fibers on the surface of a foraminous screen. The deposition of the fibers on the screen results in the formation of a layer of fibers in felted, haphazard, overlapping relation to each other on the screen. The water is pulled through the openings in the screen during the formation of the layer with sufficient force to cause a portion of the short fibers to project through the openings in the screen at an angle to the plane of the layer of felted fibers. This forms a series of spaced projections on one surface of the felted layer and a series of continuous channels running across the surface of the felted layer between the projections.

The fibers are bonded together in this manner by a resinous binder. The binder may be applied in aqueous solution or dispersion with the fibers or as a separate application after the fibers have been deposited on the screen. A separate application of the binder permits greater control of the dispersion and deposition of the fibers and greater control of the application of the binder. The binder is present in an amount which is sufficient to bind the fibers together but not form a continuous film between the fibers and thereby prevent the formation of a microporous layer. There should be a sufficient amount of binder in the fibrous separator to provide strength and flexibility to the separator for handling in the formation of the battery and during use of the battery. The amount of binder may vary between 10 to 30 percent by weight of the fibers in the separator.

The apparatus for forming the glass fiber separator can be further described by reference to the drawing in which:

FIG. 1 is a diagrammatic view of an apparatus suitable for making the separator;

FIG. 2 is an elevation of a coater adapted for depositing an aqueous dispersion of fibers on a screen;

FIG. 3 is a side view of FIG. 2;

FIG. 4 is an isometric view of the battery separator;

FIG. 5 is a view in section taken along lines V—V of FIG. 4;

FIG. 6 is an isometric view of another form of the battery separator, and

FIG. 7 is a view in section taken along lines VII—VII of FIG. 6.

In the practice of the invention, staple glass fibers such as may be formed by the introduction of a glass rod into a high temperature, high velocity blast as described in U.S. Patent No. 2,489,243 may be used to form the short, milled fibers. These fibers may have an average diameter of 1 to 5 microns and an average length of about ½ to 10 or more inches. Other types of glass fibers may be used as a starting material and may vary in composition. The composition of a typical glass fiber which is useful as a starting material is as follows:

| Ingredient— | Percent by weight |
|---|---|
| $SiO_2$ | 59.2–59.8 |
| $Na_2O$ | 14.6–14.95 |
| $Al_2O_3$ | 3.75–4.8 |
| $ZrO_2$ | 4.0–4.2 |
| $B_2O_3$ | 7.5–7.9 |
| $TiO_2$ | 8.25–8.9 |
| $Fe_2O_3$ | 0.04–0.14 |

The staple glass fibers 10 and water are introduced into a Bauer disc mill 11 which grinds the fibers up so that they are reduced in length so that about 90 percent or more by weight of the fibers have an average length of 0.008 to 0.125 inch. The ratio of the length of the milled fibers 12 to the diameter is such that 90 percent by weight or more of the fibers have an average length to diameter ratio range of 100:1 to 500:1. The disc mill is composed of a housing 13 in which are mounted two Alundum discs 14 and 15 which are in slightly spaced, face-to-face relation to each other. One of the discs 14 is stationary while the other disc 15 is mounted on a shaft 17 connected to a motor 19. The degree of grinding and reduction in length of the fibers is controlled by the distance between the faces of the discs, the power supplied to the rotating disc 15 and the length of time of grinding. By way of example, the discs, which may be 8 inches in diameter, may be about 0.001 inch apart and disc 15 may be rotated at about 3400 r.p.m.

The short, milled fibers 12 are deposited in container 20 in which they are dispersed and maintained in this condition by means of a conventional pulping stirrer 25 such as a Waring Blendor. The aqueous carrier which is used to flush the milled fibers 12 from the mill 11 is adjusted to a pH of 3 to 5 with a suitable amount of citric acid. Other inorganic acids such as sulfuric or hydrochloric acids can be used, but they may cause corrosion of some of the equipment. The water in the container 20 is also maintained at a pH of 3 to 5. The beating of the fibers in the acidified aqueous medium by means of the stirrer 25 gives a more uniform dispersion of the fibers. The fibers seem to repel each other so that each fiber is separately dispersed in the water and bunches of fibers are not likely to occur. It has also been found that the adhesion of the fibers to each other after deposition on the screen is increased by the wetting of the fibers with the acidified water solution. The amount of fibers in the aqueous acid dispersion is about 0.25 to 2 percent by weight of the dispersion with ⅜ percent based on the weight of the dispersion being a preferred concentration of fibers. Sufficient acid should be added to produce the desired pH in the aqueous dispersion of the fibers. The amount of acid employed will depend on the type of acid, the composition of the glass and the initial pH of the water.

The aqueous dispersion of short, milled fibers is pumped through a cylindrical line 28 by means of a pump 30 under a pressure of 15 to 25 pounds per square inch at a volume of 20 to 30 gallons per minute into a headbox 32. The coater is in the form of three annularly disposed cylinders 34, 36 and 38 with the cylinder 34 being an extension of the line 28. The cylinder 36 surrounds the cylinder 34 and is closed at its ends by end walls 40. These end walls have circular, centrally disposed openings therein to permit the passage of cylinder 34 through the cylinder 36 and form an enclosed annular space between cylinders 34 and 36. Cylinder 38 encloses cylinder 36 and its end walls 42 join with cylinder 36 to form an enclosed annular space between cylinder 36 and 38. The cylinder 34 has a series of openings 44 in it along its bottom side through which a portion of the aqueous dispersion from line 28 can pass.

The dispersion flows downwardly through these openings 44 and then upwardly through the annular space formed by the walls of the cylinders 34 and 36 to a slit 46 extending along the length of the top surface of cylinder 36. The aqueous dispersion passes through this slit and then downwardly through the annular passage provided by the walls of the cylinders 36 and 38 and out through a slit 48 extending along the length of the bottom side of the cylinder 38. The dispersion then flows into another cylinder 50 which is attached to the bottom side of cylinder 38 and forms a discharge chamber. The aqueous dispersion flows from the cylinder 50 through a slit 52 which extends along the bottom surface of cylinder 50. One side wall 53 extends slightly lower than the other side wall 54 of the cylinder 50. The bottom of side wall 53 almost touches a conveyor 60, whereas the bottom of side wall 54 is slightly higher by about the thickness of the layer of fibers to be deposited.

The cylinder 34 extends beyond the length of its enclosing cylinder 36 and forms into a line 61 which carries and recirculates the dispersion to line 28 at a point near the attachment of the line 28 with the cylinder 34. The recirculating line 61 provides a control to insure a steady flow of the dispersion through the openings 44 in cylinder 34 and a continual steady flow through the headbox. It is important that a steady flow be maintained in order to deposit a uniform thickness of fibers on the foraminous conveyor screen 60 which passes under the headbox 32 at a speed of about 20 to 25 feet per minute. The speed of the conveyor may be varied depending upon the thickness of layer of fibers which is desired.

Directly below the headbox 32 and on the other side of the conveyor screen 60 is suction tank 62. The opening 64 in the tank 62 is directly beneath and in line with the opening 52 of the headbox 32 and is about ⅜ inch wide. The excess water of the dispersion is pulled through the foraminous conveyor screen 60 and the short fibers are caused to deposit in closely felted relationship to form layer 66 on the screen. The vacuum which is applied by means of the tank 62 may vary from ¾ to 1¼ inches of mercury, and it is sufficient to cause a portion of the screen at an angle of about 15 to 90° to the general plane of the layer 66 of the fibers on the screen 60 and form a series of projections 68. The suction is adjusted so that the fibers are not pulled through the openings with such force that there remains starved areas or areas of thickness in the layer 66 of felted fibers which are substantially less than the average thickness of the layer 66 without the projections 68. The projections 68 extend from the layer 66 for a distance equal to about one-half to the same as the thickness dimension of the layer itself. Usually the top surface of layer 66 of felted fibers is fairly smooth; however, some unevenness is permissible.

The water which has been pulled through the conveyor screen is returned by line 69 to a tank 70 where the pH is again adjusted by means of citric or other acid to 3 to 5. A portion of this water may be used to flush the milled fibers through the disc mill 11 and a portion to replenish the water in container 20.

The layer 66 of short fibers on the screen 60 is then caused to pass under a binder coater 72 where an aqueous dispersion of a resinous binder is deposited on the layer 66 of fibers. The aqueous solution of binder passes through the layer 66 and projections 68 and through the conveyor screen 60 to tank 74 located directly underneath the coater 72 and on the other side of the screen 60 from the coater 72. The water and binder are caused to flow through the layer 66 and projections 68 and into the tank 74 by means of a vacuum in the tank 74 of ¾ to 1¼ inches of mercury. A portion of the binder is retained in the fibers in the layer 66 and projections 68. The water and binder are returned from tank 74 by way of line 76 to a binder mixing tank 78. Here, resin is added to the aqueous dispersion for use again in the coater 72. The pH of the binder solution may be also controlled to provide the best dispersion of binder if a particulated binder such as a latex is employed. For example, synthetic latices, such as polystyrene and butadiene-styrene latices, are best maintained in dispersed condition at a pH of 9 to 11. Control of the pH may not be necessary if a water soluble binder is employed.

It is preferred that the binder be in particle form such as the form of synthetic latices which are prepared by aqueous emulsion polymerization of ethylenic monomers, although other forms of synthetic resinous binders which are inert with respect to lead-$H_2SO_4$ battery reactions are suitable. Water soluble, inert organic resins such as the water soluble phenolic resins are contemplated as well as the latices which are prepared by aqueous emulsion polymerization of ethylenic monomers such as the various acrylates which are esters of acrylic and methacrylic acid and an aliphatic alcohol having 1 to 6 carbon atoms including for example, methyl methacrylate and methacrylate, vinyl chloride, styrene, acrylonitrile, chloro-vinyl acetate, butadiene, vinylidene chloride and various copolymers of the above monomers such as butadiene-acrylonitrile, vinyl chloride-vinyl acetate, butadiene-styrene copolymers and like materials which can be employed in latex form as glass fiber binders. The latices generally have an average particle size of 0.1 to 5 microns.

A plasticizer is employed with latices which tend to deposit as brittle or discontinuous films. For example, a plasticizer is generally used with latices of polyvinyl acetate, polyvinyl chloride, a polyacrylate and polystyrene; whereas, a plasticizer is generally not used with a butadiene-styrene latex. The plasticizer may be any known plasticizer for the various resins such as dibutyl phthalate, tricresyl phosphate, dioctyl phthalate, diisooctyl phthalate and other esters which are conventionally used as plasticizers.

A combination of resins which has been found to be useful to provide the desired properties to the separator is that of polystyrene and butadiene-styrene latices. The polystyrene is the principal binder and the butadiene-styrene is present in amounts of 5 to 10 percent by weight of the polystyrene to provide added flexibility and strength to the separator. A typical binder solution is as follows:

| Ingredient— | Parts by weight |
|---|---|
| Aqueous polystyrene latex containing 40% by weight of solids | 38 |
| Aqueous butadiene-styrene latex containing 48% by weight of solids with the molar ratio of the butadiene to styrene being 40 to 60 | 2.8 |
| Plasticizer (butyl benzyl phthalate) | 4.9 |
| Water | 54.3 |

Ordinarily, the aqueous binder solution may contain 10 to 20 percent by weight of resinous solids. The viscosity of the solution should be within about 4 to 8 centipoises at 20° C. and the pH should be 9 to 11.

The layer of fibers 66 with the binder distributed therein is next carried by conveyor screen 60 to an oven 80 in which the binder is heated to cure it and bond the fibers together. Just prior to and/or after layer 66 passes under the coater 72, its upper surface may be calendered by a hot roll (not shown) to produce a smooth upper surface to the layer. The layer 66 emerges from the oven 80 with the fibers which have projected through the openings in the screen bonded to form a permanent pattern of projections 68 on the lower surface of the layer. The layer 66 as thus formed is cut into strips by a circular, rotating slitter 82 and thereafter chopped into small rectangular pieces by a chopper 84.

Battery separators 90 and 91 which can be produced in this manner are shown in FIGS. 4, 5, 6 and 7. As shown in FIGS. 4 and 5 the separator 90 is formed of the short fibers 12 in closely felted, haphazard relationship with a uniform pattern of pyramid-like or dome-like projections 68 extending from one surface of the layer of felted fibers. These spaced, pyramid shaped projections 68 form channels 94 which run between the projections 68 continuously along the one surface of the separator from one edge to the opposing edge. The projections 68 are formed by the short, milled fibers which are inclined at an angle of about 15 to 90° to the general plane of the separator 90 and are bonded in this relationship by the resinous binder. The height of the projections will be about the same or slightly less than the thickness of the continuous layer portion 66 of the separator. The density of the fibers in the projections will be substantially the same as in the continuous portion of the separator but may be slightly greater so as to insure stability of these portions. The density of the fibers in the separator may be between 8 to 15 pounds per cubic foot. The density in the projections may be greater than the density of the continuous phase of the separator by having a greater binder content therein. This may be achieved by applying the heat in the oven from the under side of the conveyor, i.e. the side closest to the projections, during the curing of the binder. This appears to cause the binder in the fibers to migrate into the projections.

The size and shape of the projections may be varied by the form of the conveyor screen 60. A screen having a mesh of 14 has been found to produce satisfactory projections 68. Instead of being in the form of pyramids as shown in FIG. 5, the projections may be in the form of cones, domes, truncated pyramids or cones, or elongated ridges such as the ridges 96 shown in separator 91 in FIGS. 6 and 7. These ridges may be produced by having the fill or transverse wires of the screen spaced a greater distance apart than the warp or longitudinal wires of the screen or vice versa. It is obvious that other patterns may be formed which patterns will provide the continuous channels 94 across the face of the battery separator to permit the passage of gases which are formed during the battery reactions. The overall thickness of the separators is between 0.068 to 0.086 inch and in most cases 0.07 to 0.08 inch. Of this thickness the projections may range in height from 0.02 to 0.04 inch and the continuous layer may range from 0.035 to 0.05 inch.

Although the present invention has been described with respect to specific details of certain embodiments thereof, it is not intended that such details be limitations upon the scope of the invention except insofar as included in the accompanying claims.

This application is a division of our copending application Serial No. 781,718 filed December 19, 1958.

We claim:

1. An apparatus for depositing liquid dispersions which comprises an elongated cylinder which is open at both ends to permit passage of a liquid through it, a discharge opening along one side and between the ends of the cylinder, a liquid supply conduit connected to one end of the cylinder, a liquid recirculating conduit connected at its one end to the opposite end of the cylinder and at its other end to the supply conduit at a point adjacent to the connection of the supply conduit to the cylinder and means independent of said recirculating conduit and connected to said liquid supply conduit to force the liquid through the conduits and cylinder.

2. An apparatus for depositing liquid dispersions which comprises a first horizontally disposed, elongated cylinder which is open at both ends to permit passage of a liquid dispersion longitudinally through it, a discharge opening along the bottom side of the cylinder, a second horizontally disposed, elongated cylinder surrounding the first cylinder, end walls connected to the first and second cylinder to define an enclosed annular space between the cylinder, an opening along the top side of the second cylinder, a third horizontally disposed, elongated cylinder surrounding the second cylinder, end walls connected to the second and third cylinder to define an enclosed, annular space between the second and third cylinders, an opening along the bottom side of the third cylinder, a discharge chamber connected along the bottom of the third cylinder and having one side wall on one side and another side wall on the other side of the opening along the bottom side of the third cylinder and an opening along the bottom side of the discharge chamber formed by the side walls of the chamber, one of which extends lower than the other.

References Cited in the file of this patent

UNITED STATES PATENTS

| 1,624,384 | Bedard | Apr. 12, 1927 |
| 1,889,819 | Berry | Dec. 6, 1932 |
| 2,915,023 | Rapaport | Dec. 1, 1959 |
| 2,929,449 | Mardon et al. | Mar. 22, 1960 |
| 2,970,644 | Webster | Feb. 7, 1961 |
| 3,009,517 | Webster | Nov. 21, 1961 |
| 3,016,089 | Webster | Jan. 9, 1962 |

FOREIGN PATENTS

| 1,174,143 | France | Mar. 6, 1959 |

OTHER REFERENCES

Calkin: "Modern Pulp and Paper Making," 3rd edition, 1957, Reinhold Publishing Corp., New York, page 312.